Dec. 28, 1943. J. W. HARPER 2,337,995
SEPARABLE FASTENER
Filed Nov. 10, 1942

Inventor
John W. Harper
By McMorrow & Berwall
Attorneys

Patented Dec. 28, 1943

2,337,995

UNITED STATES PATENT OFFICE 2,337,995

SEPARABLE FASTENER

John W. Harper, Highlands North, Johannesburg, Transvaal, Union of South Africa

Application November 10, 1942, Serial No. 465,123

2 Claims. (Cl. 24—217)

This invention relates to a separable fastener of the snap type including a female element and a male element. The primary object of the invention is the provision of a fastener of the character stated which will have a positive securing action between the male and female elements thereof to prevent accidental separation of said elements, and will reduce to a minimum the amount of manual force necessary to be used for bringing about separation of the female and male elements when desiring to unfasten the separable fastener.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a vertical sectional view illustrating a separable fastener constructed in accordance with my invention.

Figure 1:
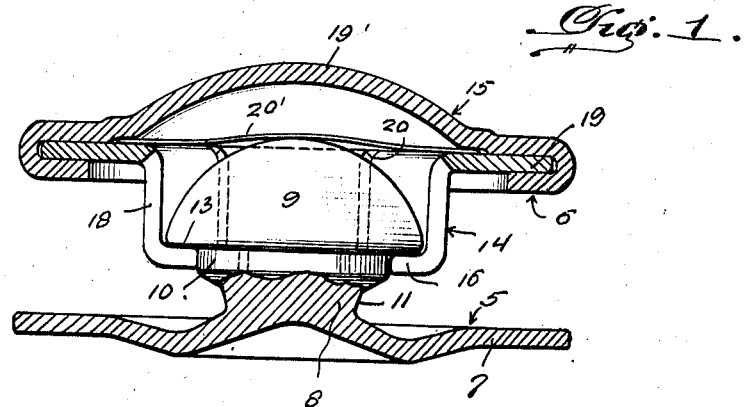
Figure 3:
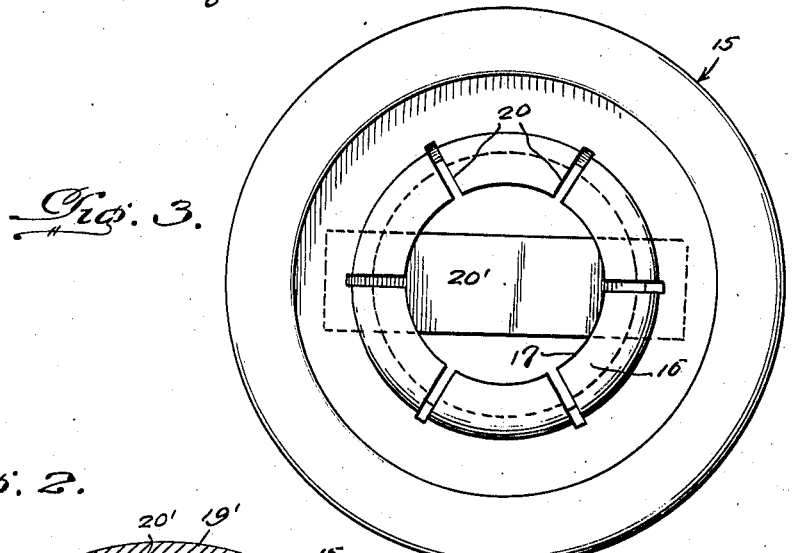
Figure 3 is a bottom plan view illustrating the female element.

Referring in detail to the drawing, the numeral 5 indicates in entirety the male element and the numeral 6 indicates the female element.

The male element consists of an attaching disc 7, a shank 8 and a head 9. The shank, head and disc are of integral construction and the disc 7 may be secured to an article in any well known manner for the purpose of anchoring the male element thereto.

The head 9 is substantially semi-spherical shaped, as clearly shown in Figure 1 or presenting a dome shape. The shank 8 includes an annular seat 10 and an annular seat 11 separated by a bevel face 12 of annular formation. An annular shoulder 13 occurs between the head 9 and the annular seat 10 of the shank. The shoulder 13 is arranged at right angles to the annular seat 10, as clearly shown in Figures 1 and 2 of the drawing.

The annular seat 11 is arranged at a slight inclination to the annular seat 10 as is apparent from Figure 1. The diameter of the seat 11 is less than the diameter of the seat 10.

The female element 6 consists of a cup-shaped member 14 and a cap 15. The cup-shaped member 14 includes a bottom wall 16 having an opening 17 therein and an upstanding annular wall 18 provided with an outwardly directed marginal flange 19 arranged at right angles to the upstanding annular wall 18 and on which the cap 15 is crimped, as shown in Figure 1. The cap 15 includes a dome-shaped portion 19' overlying the opening 17.

A leaf spring 20 has its ends anchored between the cap 15 and the marginal flange 19 and traverses the cup-shaped portion of the female element, also the opening 17 thereof.

To provide flexibility to the cup-shaped portion of the female element, spaced slots 20' are provided in the bottom wall 16 and the upstanding annular wall 18. The slotting of the walls 16 and 18 as stated will allow the cup-shaped portion of the female element to expand, increasing the diameter of the opening 17. The normal diameter of said opening 17 is only slightly larger than the diameter of the seat 10 and much less than the diameter of the shoulder 13, so that when the male and female elements are assembled as shown in Figure 1 the wall of the opening 17 will lightly engage the seat 10 with the bottom wall abutting the shoulder 13 and the leaf spring 20 engaging the head 9 and bowed thereby. The spring when bowed retains the bottom wall 16 in engagement with the shoulder 13 rendering it practically impossible for the male and female elements to become accidentally separated.

Figure 2:
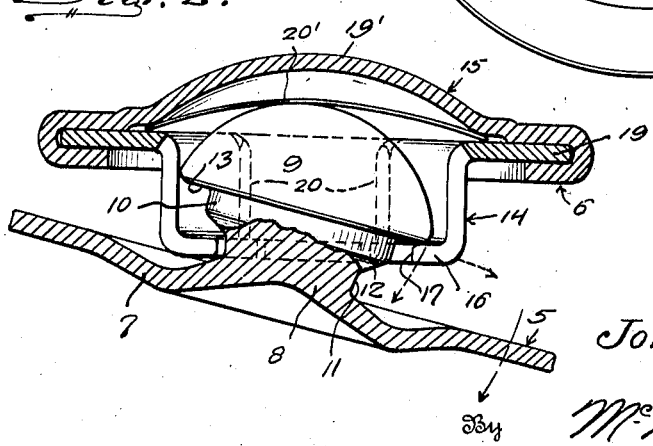
Figure 2 is a view similar to Figure 1 showing the relative positions of the male and female elements when a complete separation of said elements is to be brought about.

To separate the male and female elements, a pressure is placed on edges of the male and female elements opposite to each other, bringing said male and female elements into a cocked position with respect to one another, as shown in Figure 2. When in this cocked position a portion of the wall of the opening 17 moves opposite the seat 11 and may contact therewith while the other portion of the wall of the opening 17 moves away from the seat 10 with the bottom wall 16 engaging only a limited portion of the shoulder 13 so that on a separating action or force placed on the male and female elements opposite to where the pressure is applied thereto, the cup-shaped portion of the female element may readily ride off of the head 9 of the male element thereby bringing about complete separation of the male and female elements.

To connect the male and female elements said elements are first placed in a cocked position with respect to each other and then said male and female elements are pressed together, permitting them to assume a normal position with respect to each other, as shown in Figure 1, with the wall of the opening 17 in engagement with the seat 10 and the bottom wall engaging under the shoulder 13 thereby firmly securing the male and female elements together. It will therefore be seen that the separation and joining of the male and female elements may be readily brought about with a minimum effort on the part of the operator and further it will be seen that when the male and female elements are connected together, their connection with each other will be such that accidental separation of the male and female elements will be obviated.

Further, it will be noted that when separating the male and female elements after they have been moved into said cocked relation, as shown in Figure 2, the cup-shaped portion of the female element only has to expand a minimum amount in order that the bottom wall 16 may pass free of the shoulder 13 and off of the head 9.

While I have shown and described the preferred embodiment of my invention, it will be understood that minor changes in construction, combination and arrangement of parts may be made without departing from the scope and spirit of the invention as claimed.

Having thus described the invention, what I claim is:

1. In a separable fastener, a male element and a female element, said male element including integrally connected head, shank and attaching plate, said shank being of a diameter less than the diameter of the head and thereby providing to the head an annular shoulder and said shank provided with spaced annular seats of different diameters connected by a bevel face with one annular seat disposed at an inclination to the other annular seat thereof, said female element including a flexible cup-shaped portion provided with an opening having a diameter less than the diameter of the head and of approximately the same diameter as the diameter of one of the seats of the shank and greater than the diameter of the other seat of said shank, a cap closing the cup-shaped portion of the female element, and a spring carried by the female element to engage the head.

2. In a separable fastener, a male element and a female element, said male element including integrally connected head, shank and attaching plate, said shank being of a diameter less than the diameter of the head and thereby providing to the head an annular seat and provided with spaced annular seats of different diameters connected by a bevel face with one annular seat disposed at an inclination to the other annular seat thereof, said female element including a cup-shaped portion provided with an opening having a diameter less than the diameter of the head and of approximately the same diameter as the diameter of one of the seats of the shank and greater than the diameter of the other seat of said shank, a cap closing the cup-shaped portion of the female element, said cup shaped portion having slots connecting with the opening to provide flexible portions thereto, and a leaf type spring having its ends clamped to the cup-shaped portion by the cap to engage the head and force the shoulder of said head into engagement with the cup-shaped portion with the wall of the opening thereof in engagement with one of the seats of the shank and to permit the wall of the opening to engage one of the seats and spaced from the other seat when the male and female elements are moved into cocked position with respect to each other whereby the cup shaped portion may be moved over the head with a minimum number of the flexible portions being flexed.

JOHN W. HARPER.